United States Patent [19]

Kurita

[11] 4,084,898
[45] Apr. 18, 1978

[54] PHOTOCOPYING APPARATUS MIRROR DRIVE MEANS

[75] Inventor: Takaji Kurita, Kawachinagano, Japan

[73] Assignee: Minolta Camera Kabushiki Kaisha, Osaka, Japan

[21] Appl. No.: 461,786

[22] Filed: Apr. 17, 1974

[30] Foreign Application Priority Data

Apr. 24, 1973 Japan .............................. 48-48881[U]

[51] Int. Cl.² ...................... G03G 15/28; G03G 15/32
[52] U.S. Cl. ............................................. 355/8; 355/66
[58] Field of Search ........................... 355/8, 66, 81, 84

[56] References Cited

U.S. PATENT DOCUMENTS

| 3,431,053 | 3/1969 | Wick et al. | 355/66 |
| 3,512,886 | 5/1970 | Wirley et al. | 355/8 X |
| 3,575,509 | 4/1971 | Suzuki | 355/66 |
| 3,609,024 | 9/1971 | Suzuki | 355/66 X |

*Primary Examiner*—Fred L. Braun
*Attorney, Agent, or Firm*—Wenderoth, Lind & Ponack

[57] ABSTRACT

In a photocopying apparatus wherein a first mirror is suitably connected to a second mirror, a mirror drive comprises an endless chain which is driven on a continuous path, and to which is affixed an actuation element, which may contact a projection attached to a mounting base supporting the first mirror, whereby the first and second mirrors may be driven forwards by the endless chain acting through the actuation element and the first mirror base projection.

7 Claims, 9 Drawing Figures

PHOTOCOPYING APPARATUS MIRROR DRIVE MEANS

BACKGROUND OF THE INVENTION

The present invention relates to a photocopying apparatus wherein two mirror assemblies are moved at certain speeds past a stationary document and direct images of successive portions thereof onto a moving photosensitive material, and more particularly to a photocopying apparatus of a type wherein successive portions of an original document are scanned and images of the successive portions are transmitted by optical means, comprising first and second mirrors, which are moved parallel to the original document, and of which the second mirror is moved at half the speed of the first mirror, onto a photosensitive material which is moved in a horizontal or a vertical plane, the speeds of the mirrors and of the photosensitive material being in definite ratios.

There is known a type of photocopying apparatus wherein a first mirror, together with a light source, is moved horizontally past a document to be copied, and directs images of successive portions thereof onto a second mirror, or mirror assembly, which is moved horizontally at half the speed of the first mirror, and directs the document images through an optical means comprising, for example, a fixed lens, onto a moving photosensitive material. A requirement in this type of photocopying apparatus is that the first and second mirrors, or mirror assemblies, be moved horizontally along a straight line below a document to be copied. Conventional drive means include, for example, clutch-transmission means, and cable lines and pulleys by which the first and second mirrors are driven. A particular problem associated with conventional mirror drive means in photocopying apparatus is that at the start of a photocopying process, the impact of initial drive supplied to the mirror can cause the mirrors to shake slightly, which results in the production of blurred photocopies, as well as being the source of noise and increased wear.

SUMMARY OF THE INVENTION

It is accordingly an object of the present invention to provide an improved means for drive of mirrors in a photocopying apparatus.

It is another object of the invention to provide a photocopying apparatus wherein a mirror guide shaft or shafts may be short, whereby a more compact photocopying apparatus may be obtained.

It is further object of the invention to provide a photocopying apparatus having a mirror drive means which is simple in construction and which applies smooth initial drive to mirrors, whereby jolting of the mirrors is avoided.

In accomplishing these and other objects, in a photocopying apparatus wherein a first mirror is suitably connected to a second mirror, whereby the second mirror is driven when the first mirror is driven, there is provided, according to the present invention, a mirror drive means comprising an endless chain or belt, which is driven on a continuous path, and to which is affixed a actuation element, which may contact a projection attached to a mounting base supporting the first mirror, whereby the first and second mirrors may be driven forwards by the endless belt or chain acting through the actuation element and the first mirror base projection.

In each photocopying process, initial contact between the belt or chain actuation element and the first mirror base projection is made at a point at which that portion of the belt or chain carrying the actuation element changes direction, and at which the component of velocity of the actuation element in the forwards direction is zero. From this point of initial contact, the actuation element is carried over a circular arc and then in a horizontal forwards direction, whereby the first and second mirrors are not accelerated sharply, or jolted, but are brought smoothly to a required speed. At the end of each photocopying process, the first mirror base projection is moved out of contact with the actuation element by a simple means, and when the first and second mirrors are returned to initial positions, the first mirror base projection is moved back into an alignment wherein it may be contacted by the actuation element on the belt or chain.

BRIEF DESCRIPTION OF THE DRAWINGS

These and other objects and features of the present invention will become apparent from the following description taken in conjunction with preferred embodiments thereof with reference to the accompanying drawings in which.

DETAILED DESCRIPTION OF THE INVENTION

Figure 1:
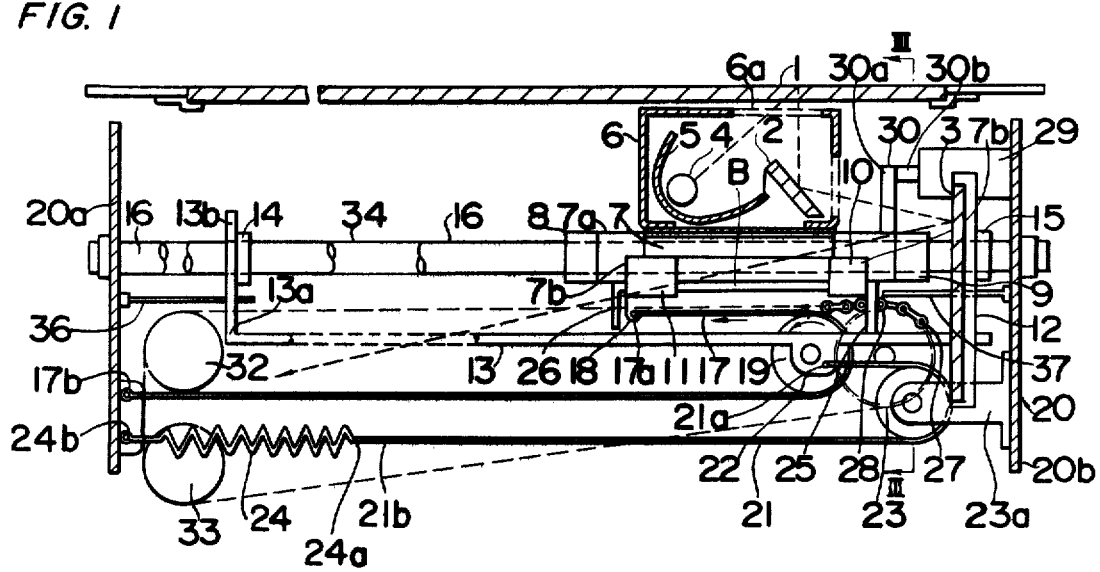
FIG. 1 is a schematic cross-sectional view of a photocopying apparatus according to one embodiment of the present invention.

Before the description of the present invention proceeds, it is to be noted that like parts are designated by like reference numerals throughout the accompanying drawings.

Referring initially to FIG. 1, there is shown a photocopying apparatus comprising a main frame 20 including front and rear walls 20a, 20b and a horizontal rest 1. A document to be copied is placed on the rest 1, where it remains stationary, and successive portions thereof are viewed through a moveable shutter 6a, slit, or similar means, which is provided on a lamp housing 6 below the document rest 1. The lamp housing 6 is moveable parallel to the document rest 1, in a manner described below, and carries a mirror 2 which is inclined at 45° to the document rest 1, a lamp 4, and a reflector 5. When the lamp housing 6 is moved, light emitted by the lamp 4 is directed by the reflector 5 onto successive portions of a document on the document rest 1 through shutter 6a, image rays from these successive portions fall onto the inclined mirror 2, and are directed thereby onto a vertical mirror 3, which is moved horizontally in the same direction as the inclined mirror 2 and at half the speed thereof, in a manner described below, and which directs the images to a focusing means and then to a photosensitive material, not shown, in a known manner, the path of image rays being as indicated by a single dashed line in FIG. 1. The housing 6 containing the mirror 2 and lamp 4 assembly is fixedly mounted on an upper portion of a moveable base 7.

Figure 3:
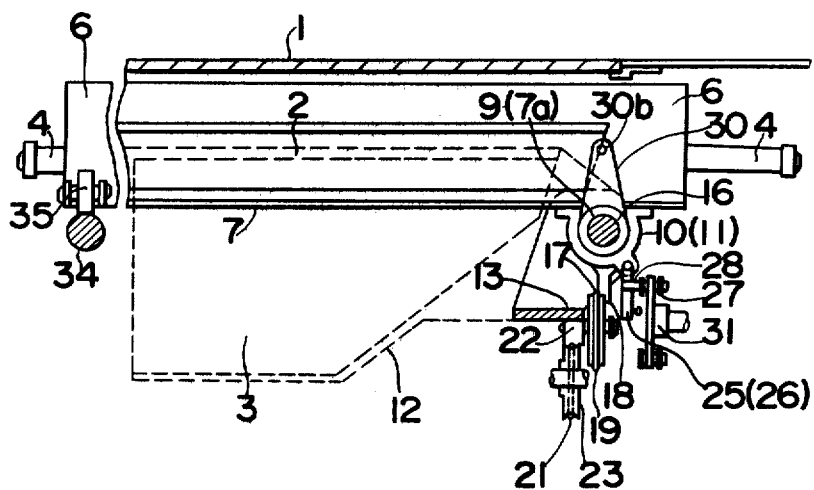
FIG. 3 is a cross-sectional view taken through the line III — III of FIG. 1.

In FIGS. 1 and 3, one side of the base 7 is supported in front and rear bearings 8, 9, which are slidably mounted on a first shaft 16. There is provided a bracket 7a of cylindrical type under the one side of the base 7, the first shaft 16 being loosely passed through the bracket 7a and front and rear bearings 8, 9 being mounted on both ends of the bracket 7a. Runners 35, which may roll along a second shaft 34, are mounted on the other side of the base 7. The first and second shafts 16, 34 are horizontal, on a level and parallel with one another, and extend in a front to rear alignment with respect to the copying apparatus, and adjacent to opposite sides thereof, opposite ends of the shafts 16, 34 being fixedly mounted in front and rear walls 20a, 20b of the main frame 20. The shafts 16, 34 being horizontal, the base 7, and hence mirror 2 and lamp 4, may be moved forwards or rearwards (leftwards or rightwards, respectively, in FIG. 1) parallel to the document support 1. A bumper arm 30, comprising a vertical portion 30a and an upper, rearwardly extending portion 30b is mounted on the upper side of the base 7, near the rear end thereof. When the base 7 of the mirror and lamp is drawn back to a rearmost position, in a manner described below, the bumper arm 30 comes into contact with a bumper block 29 of resilient material, which is mounted on the rear wall 20b of the main frame 20, whereby the mirror 2 and lamp 4 are stopped gently, and shock thereto is avoided. Bearing brackets 10, 11, in which are mounted rods 25, 26 (described below), respectively, are affixed to the lower portion 7b of the base 7, at the side thereof nearer to the first shaft 16.

Still referring to FIGS. 1 and 3, the second mirror 3 is held in a vertical alignment by a moveable frame 12. One end of a horizontal arm 13 is in fixed connection to one side of a lower portion of the frame 12, below the level of the shaft 16. The arm 13 extends forwards, at right-angles to the frame 12, and the front end thereof forms a short section 13a, which extends vertically upwards, to slightly above the level of the shaft 16, the shaft 16 passing slidably through an opening 13b formed in the vertical section 13a. The second mirror frame 12 is supported, and may be slid along the first shaft 16 by means of front and rear bearings 14, 15, which are slidably mounted on the shaft 16, and are in fixed attachment to the arm vertical section 13a and frame 12, respectively. The other side of the frame 12 and vertical section 13a are supported by runners (not shown) on the second shaft 34, the runners rolling along the second shaft 34, whereby the frame 12 and second mirror 3 may be moved forwards or rearwards along shafts 16, 34 in a horizontal line, as described below. As shown most clearly in FIG. 1, the first mirror bearings 8, 9 lie between the second mirror bearings 14, 15, i.e., the bearing 14 is forward of the bearing 8, and the bearing 15 is to the rear of the bearing 9 on the shaft 16. The distance between the second mirror bearings 14, 15 is made at least equal to the distance between the first mirror bearings 8, 9 plus half the length of the maximum size document that can be copied by the apparatus, i.e., the distance over which the first mirror is required to be moved in order to scan the entirety of a document to be copied. Support means of the runners on the second shaft 34 at the other sides of the first and second mirrors are provided in the same relationships as the bearings 8, 9, 14, 15 in a manner not to disturb but to assist in the movement of the bearings. The minimum length of the shafts 16, 34 is made equal to the sum of the length of the maximum size document copyable by the apparatus, the distance between the first mirror bearings 8, 9, and the lengths of the actual bearings 14, 15. It is to be noted that the above-described arrangement is particularly advantageous, and permits a more compact photocopying apparatus, since the shafts 16, 34 need not be as long as guide shafts in a conventional apparatus.

As indicated most clearly in FIG. 1, near the rear end of the arm 13 (extending from the second mirror frame 12) there is provided an integrally or fixedly attached vertical plate 22, on which a pulley 19 carrying a cable line 17 is rotatably mounted. One end 17a of the cable line 17 is fixedly attached to a lug 18 which is fixedly attached to, and extends downwards from the front bearing bracket 11 affixed to the first mirror base 7. The cable line 17 is led rearwards from the lug 18, around the pulley 19, and then forwards, the other end 17b thereof being fixedly attached to a front wall portion 20a of the main frame 20. A pulley 23 carrying a cable line 21 is rotatably mounted on a support arm 23a which is affixed to a lower portion of the rear wall 20b of the main frame 20. One end 21a of the cable line 21 is fixedly attached to the plate 22 on the arm 13, and the other end 21b thereof is in fixed or integral attachment to one end 24a of a compression spring 24, the other end 24b of which is fixedly attached to the front wall 20a of main frame 20. By this arrangement of pulleys 19, 23 and cable lines 17, 21, when the first mirror 2 and lamp 4 on the base 7 are moved forwards by a driving means in a manner described below, the second mirror 3 in the frame 12 is also moved forwards at half the speed of the base 7, as is evident from the law of the pulley 19 and cable line 17. The spring 24 on the cable line 21 exerts a force to subsequently return the base 7 and frame 12 to initial positions through the pulley 23. Forward drive to the first mirror and lamp base 7 is supplied by a chain 27 acting on the above-mentioned rods 25, 26 in the bearing brackets 10, 11 attached to the base 7.

Figure 2:
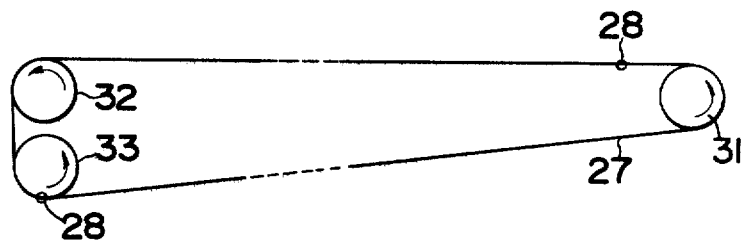
FIG. 2 is a schematic representation of a mirror assembly drive means.

The chain 27 carries a fixedly attached pin 28 and is driven by sprocket wheels 31, 32, 33 (FIG. 2). The sprocket wheel 31 is rotatably mounted in a rear portion of the photocopying apparatus and the sprocket wheels 32, 33 are mounted in a front portion of the apparatus, the sprocket wheel 32 being generally level with the sprocket wheel 31 and above the sprocket wheel 33. As shown most clearly in FIG. 3, the pin 28 attached to the chain 27 extends horizontally therefrom, whereby, when the sprocket wheels 31, 32, 33 are rotated, by conventional means such as a motor, gear and the like (not shown), and the chain 27 is driven, the pin 28 is brought into contact with, and pushes the rear rod 25.

Figure 4:
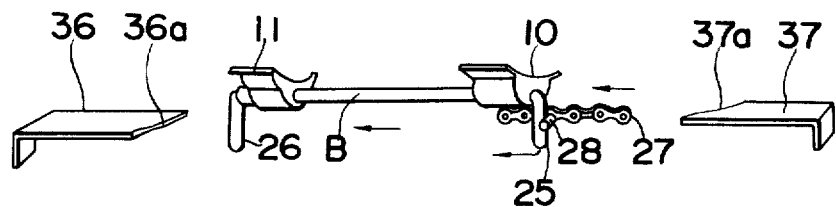
FIG. 4 is a perspective view explanatory of the action of parts of the apparatus of FIG. 1.
Figure 5:
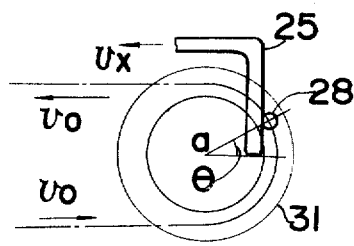
FIG. 5 is an explanatory drawing showing vector forces applied upon initial movement of a mirror in connection with contact of a pin and rod of FIG. 1.

Reference is now had to FIGS. 4 and 5, which illustrate schematically the action of forward drive of the first mirror assembly, and hence of the second mirror assembly. In FIG. 4, the rods 25, 26 are constituted by downwardly bent, integral end portions of a bar B which extends through holes formed in the brackets 10, 11, and may not move forwards or rearwards with respect to the brackets 10, 11. The bar B may be turned in the openings in the brackets 10, 11 but fits loosely therein, so that once turned to a particular position, the bar B automatically returns to a position in which the rods 25, 26 align vertically by means of their weight unless forcibly turned again. At the start of a photocopying process, when the base 7 and mirror 2 and housing 6 supported thereby are in a rearmost position, the rods 25, 26 extend approximately vertically downwards. When the chain 27 is rotated, the pin 28 contacts the rod 25, and, acting therethrough, pushes the base 7, and first mirror 2 and other means contained in the housing 6, forwards, parallel to a document supported on rest 1, while at the same time the second mirror 3 is drawn forwards at half the speed of the first mirror 2, as described earlier, and the image of the document is directed to and formed on a photosensitive material in a conventionally known manner. When the first and second mirrors 2, 3 have been moved forward a sufficient distance to permit scanning of the entirety of the document, the front rod 26 is brought into contact with the bevel edge 36a of a plate 36 which is fixedly mounted in a forward part of the photocopying apparatus. As the base 7 continues to be moved forwards by the pin 28 on the chain 27, the rod 26 rides on the bevel edge 36a, and is pushed thereby away from the chain 27, thus causing the bar B to turn and the integrally attached rod 25 to move away from the chain 27 and out of contact with the pin 28. Forward drive to the base 7 therefore ceases, and the pin 28 is carried by the chain 27 past the rear rod 25, and also past the front rod 26, since, as noted earlier, the bar B remains turned in a particular position in which the rods 25, 26 align approximately horizontally as far as forcibly moved by means of the plate 36. The chain 27 subsequently carries the pin 28 around the sprocket wheels 32, 33 (FIG. 2), and to the sprocket wheel 31, to a position in which the pin 28 may again contact the rear rod 25. At the same time, the spring 24, acting through the cable line 21, pulley 23, and plate 22 (FIG. 1) moves the first and second mirror assemblies back to rearmost positions, in readiness for obtaining another photocopy, stopping of the rearward movement of the first and second mirror assemblies being effected gradually by contact of the above-mentioned bumper arm 30 against the bumper block 29 (FIG. 1).

In FIG. 4, when the base 7 approaches the rearmost position, the rear rod 25 is brought into contact with the bevel edge 37a of a plate 37, which is fixedly attached to a rear portion of the photocopying apparatus. The bevel edge 37a is inclined oppositely to the bevel edge 36a of the forward plate 36, and as the base 7 continues to be moved rearwards by the force of the spring 24, the rod 25 rides on the bevel edge 37a and is pushed towards the chain 27, whereby the bar B is again turned to bring the rods 25, 26 into a generally vertical alignment, i.e., the rod 25 is again contactable by the pin 28 on the chain 27.

With reference now to FIG. 5, jolting of the first mirror base 7, and consequent lack of definition or similar faults in a photocopy obtained, are avoided, since when the base 7 is in a rearmost position, i.e., prior to a photocopying process, the rear contacted rod 25 is adjacent to the rear side of the sprocket wheel 31, and in a position wherein the lower end of the rod 25 is initially contacted by the pin 28, being carried by the chain 27, when the pin 28 is level, or almost level with the rotary center of the sprocket wheel 31, i.e., when the angle $\theta$ is zero, or almost zero. In other words, when the pin 28 initially contacts the rod 25, the horizontal component of the displacement of the pin 28 is zero. From this point of initial contact, as the sprocket wheel 31 continues to rotate, the pin 28 is carried upwards and forwards, over the arc of a circle of the sprocket wheel 31, and is moved to a higher part of the rod 25, while remaining in contact therewith and pushing the rod 25, and hence base 7, forwards. From the time of initial contact of the pin 28 and rod 25, the base 7 is moved forwards at a speed $Vx = Vo \cdot \sin(Vot/a)$, where $Vx$ is the horizontal component of velocity of the pin 28 travelling around the sprocket wheel 31, $Vo$ is the speed of the chain 27, and $a$ is the radius of the sprocket wheel 31. The base 7 is moved forwards at an increasing speed, until the pin 28 leaves the periphery of the sprocket wheel 31, when $Vx = Vo$, the acceleration of the base 7 being $(dVx/dt)$ max. $= Vo^2/a$. In other words, the acceleration applied to bring the first and second mirror assemblies to the required speed is extremely small, and the mirror assemblies are brought to these required speeds smoothly, without jolting.

Needless to say in the above-described mirror drive means, there may be provided two or more pins 28 on the chain 27, which successively contact the rear rod 25, to effect forward drive of the first and second mirror assemblies in obtaining successive photocopies of a document or documents.

Figure 6:
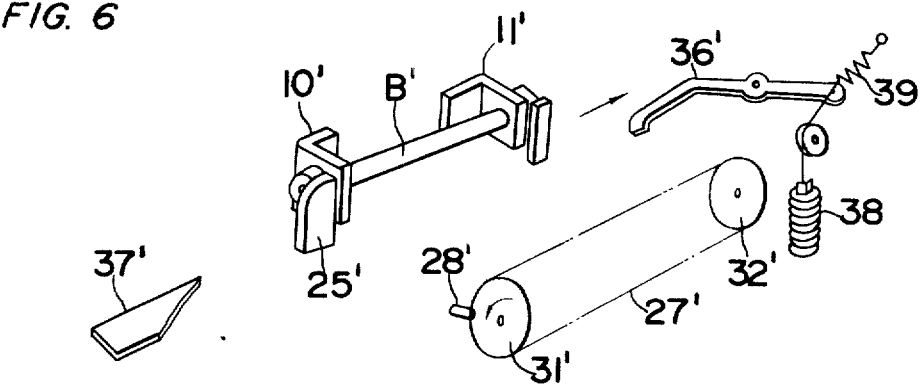
FIG. 6 is a schematic perspective view of essential components employed in a modification of a mirror drive means according to the invention.

In a modification of the invention, shown in FIG. 6, a bar B' is rotatably mounted in the bearing brackets 10', 11' affixed to the first mirror base 7'. The bar B' is straight, and the front and rear end portions thereof project slightly beyond the front side of the front bearing bracket 11', and the rear side of the rear bearing bracket 10', respectively. Contact portions 25' and 26' are fixedly mounted on the projecting rear and front end portions, respectively, of the bar B'. The contact portions 25', 26' prevent forward or rear movement of the bar B' relative to the brackets 10', 11', and are turned to a vertical or to an inclined alignment when the bar B' is turned similarly to the rods 25, 26 described with reference to FIGS. 1 through 5.

Still referring to FIG. 6, in this modification of the invention, the chain 27' is driven by two sprocket wheels 31', 32', which are of equal diameter, and are mounted level with one another, and the pin 28' initially contacts the rear contact portion 25' when level with the rotary center of the sprocket wheel 31', and is then moved downwards and forwards, and advances the first mirror base 7' while being carried along the lower stretch of the chain 27'. When the base 7' is brought to a forwardmost position, a lever 36' pushes the front contact portion 26' away from the chain 27', thereby causing the bar B' to turn and the rear contact portion 25' to be disengaged from the pin 38'. The lever 36' is pivotally mounted in a forward part of the copying apparatus, and the outer end of one arm thereof is connected both to an electromagnetic means such as a solenoid and plunger assembly 38 and to a spring 39. The spring 39 exerts a constant force which normally holds the lever 36' in a configuration in which the other arm thereof is generally parallel to the line of advance of the base 7'. When the base 7' arrives at a certain forward point a switch or similar means is closed, and the solenoid and plunger assembly 38 is actuated to pivot the lever 36' counter to the force of the spring 39, whereby the lever 36' contacts the front contact portion 26', and pushes the contact portion 26' away from the chain 27'.

When the base 7' returns to a rearmost position, the catch portions 25', 26' are moved back to a generally vertical alignment by a plate 37' contacting the rear contact portion 25'.

Figure 7:
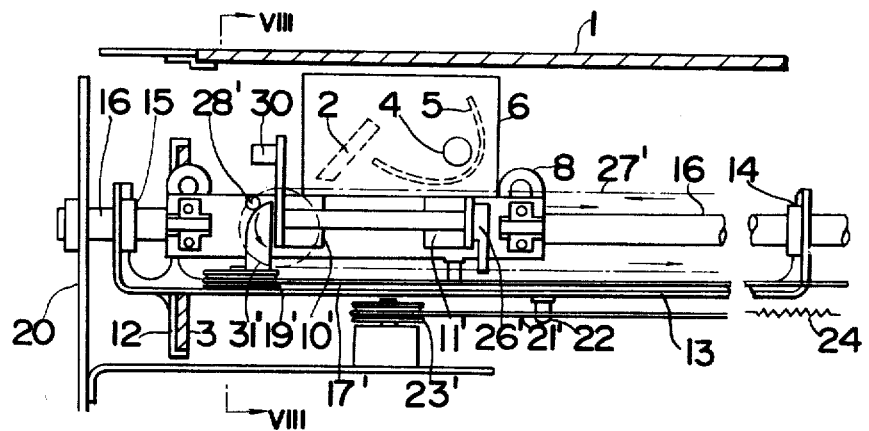
FIG. 7 is a schematic cross-sectional view of an upper portion of a photocopying apparatus with which the mirror drive means of FIG. 6 is employed.
Figure 8:
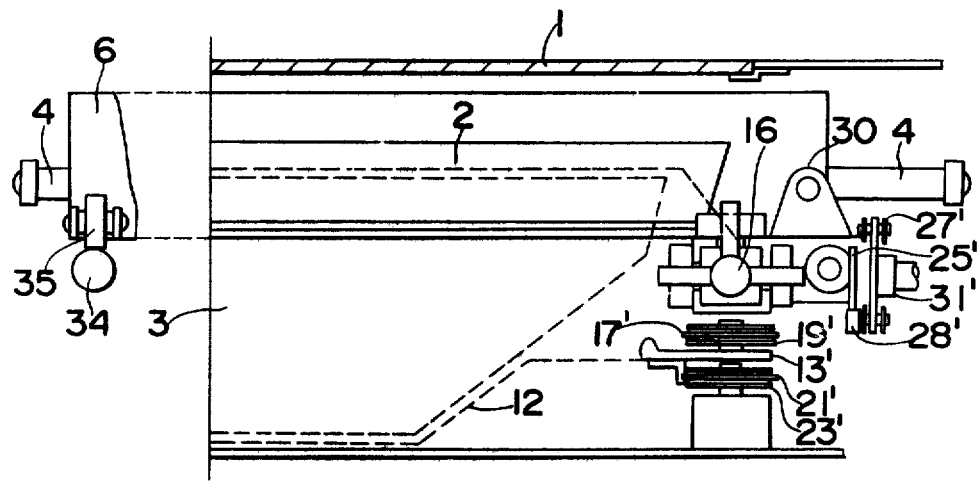
FIG. 8 is a cross-sectional view taken through the line VIII — VIII of FIG. 7.

This modification of the invention may be employed, for example, in the photocopying apparatus shown in FIGS. 7, 8, wherein connections and action of the cable lines 17' and 21' are as described earlier, but the pulleys 19' and 23' are mounted horizontally, the pulley 19' being pivotally mounted on the upper side of the second mirror frame arm 13', and the pulley 23' being mounted on a block which is fixedly supported in a lower part of the apparatus. Otherwise, the photocopying apparatus of FIGS. 7, 8 is the same as that described in reference to FIGS. 1 through 5.

Figure 9:
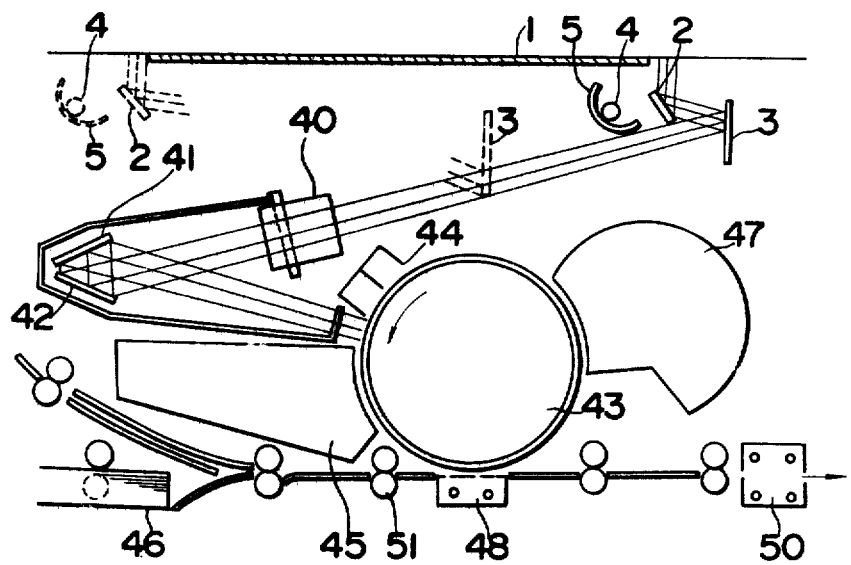
FIG. 9 is a schematic cross-sectional view of a dry-process transfer photocopying apparatus with which a mirror drive means according to the invention is employed.

FIG. 9 is a schematic representation of a complete dry-process transfer photocopying apparatus wherein a mirror drive means according to the invention may be employed. In the apparatus, as the first mirror 2, lamp 4, reflector 5, and second mirror 3 are moved forwards, from the positions indicated by solid lines to the positions indicated by dashed lines in the drawing, images of successive portions of a document supported horizontally on the support 1 are directed from the first mirror 2 to the second mirror 3, by the second mirror 3, through a fixed lens 40, to a pair of fixed mirrors 41, 42, which are at an angle to one another, and thence onto successive portions of the photosensitive outer periphery of a rotary drum 43, which is provided in a lower part of the apparatus, and is rotated at a definite speed. Each portion of the outer periphery of the drum passes a charging unit 44 immediately prior to exposure, and a toner coating unit 45 immediately subsequent to exposure. After this, that portion of the drum 43 carrying an electrostatic image of the document to be copied is brought to the location of a transfer unit 48, and there brought into contact with a sheet of copy paper, which is supplied to the same location from a copy paper reserve 46 by rolls 51, whereby the image of the document is transferred onto the sheet of copy paper. Subsequently, the image-carrying portion of the drum 43 is brought to the location of a toner removal unit 47, where remnant toner particles are removed therefrom in readiness to obtaining another photocopy, and the sheet of copy paper is carried to a fixing unit 50, and thence to an output tray not shown.

As is clear from the above description, the present invention provides a mirror drive means which is simple and economical in construction, avoids jolting upon initial movement of moveable mirrors in a photocopying apparatus, and accelerates the mirror smoothly up to the required speeds, whereby wear of equipment is reduced, and photocopies having good resolution are obtained.

Although the present invention has been fully described by way of the preferred embodiments thereof with reference to the accompanying drawings, it is to be noted that various changes and modifications are apparent to those skilled in the art. Therefore, unless such changes and modifications otherwise depart from the true scope of the present invention, they should be construed as included therein.

What is claimed is:

1. A photocopying apparatus comprising:
   a horizontally movable optical assembly slidably supported by a support means;
   a projecting lever member fixedly attached to said support means;
   an endless drive means having a pin member attached thereto;
   said endless drive means being rotated by a plurality of wheel means;
   said pin member, upon initiation of drive of said endless drive means, being located at a position on one of said wheel means where the horizontal component of velocity thereof is substantially zero;
   said pin member contacting said lever member to move said optical assembly;
   said pin member and said lever member being positioned such that the initial contact therebetween is at a position at which the horizontal component of velocity of said pin member is substantially zero; and
   means for releasing the contact of said pin member with said lever member and to allow return of said optical assembly to a starting position.

2. An apparatus as claimed in claim 1, wherein said lever member comprises a bar rotatably supported in said support means and extending in the direction of movement thereof; and first and second contact portions on opposite ends of said bar.

3. An apparatus as claimed in claim 2, wherein said contact portions comprise integral ends of said bar bent transverse to said direction.

4. An apparatus as claimed in claim 2, wherein said contact portions comprise members fixed to opposite ends of said bar and extending transverse thereto.

5. An apparatus as claimed in claim 2, wherein said pin member contacts said first contact portion; and said releasing means comprises a plate having a bevel edge positioned to contact said second contact portion and rotate said bar with respect to said support means to bring said first contact portion out of contact with said pin member.

6. An apparatus as claimed in claim 2, wherein said pin member contacts said first contact portion; and said releasing means comprises a lever means movable into contact with said second contact portion for rotating said bar with respect to said support means to bring said first contact portion out of contact with said pin member.

7. An apparatus as claimed in claim 2, further comprising means positioned adjacent said starting position of said optical assembly for moving said first contact portion into said initial contact position.

* * * * *